United States Patent
Thompson

(10) Patent No.: US 9,009,340 B2
(45) Date of Patent: Apr. 14, 2015

(54) DYNAMIC QOS IN A NETWORK DISTRIBUTING STREAMED CONTENT

(75) Inventor: Geoffrey Thompson, Keighley (GB)

(73) Assignee: EchoStar UK Holdings Limited, Steeton (GB)

(*) Notice: Subject to any disclaimer, the term of this patent is extended or adjusted under 35 U.S.C. 154(b) by 218 days.

(21) Appl. No.: 13/054,563

(22) PCT Filed: Jul. 16, 2009

(86) PCT No.: PCT/EP2009/059187
§ 371 (c)(1),
(2), (4) Date: Apr. 8, 2011

(87) PCT Pub. No.: WO2010/007143
PCT Pub. Date: Jan. 21, 2010

(65) Prior Publication Data
US 2011/0179455 A1   Jul. 21, 2011

(30) Foreign Application Priority Data

Jul. 18, 2008 (GB) .................. 0813203.7
Mar. 13, 2009 (GB) .................. 0904376.1

(51) Int. Cl.
*G06F 15/16* (2006.01)
*H04L 12/801* (2013.01)
(Continued)

(52) U.S. Cl.
CPC ............. *H04L 47/10* (2013.01); *H04L 47/15* (2013.01); *H04L 47/18* (2013.01);
(Continued)

(58) Field of Classification Search
CPC ............ H04N 7/24; H04N 21/44004; H04N 21/2387; H04N 21/6587; H04N 7/18; H04L 25/068; H04L 1/0022; H04L 1/0025; H04L 12/2494; H04L 12/2805; H04L 12/2812; H04L 12/40117
USPC ................ 725/82, 86, 135, 139; 709/231.235
See application file for complete search history.

(56) References Cited

U.S. PATENT DOCUMENTS 5,271,000 A * 12/1993 Engbersen et al. ........... 370/244
6,041,039 A * 3/2000 Kilkki et al. ................. 370/230

(Continued)

FOREIGN PATENT DOCUMENTS

WO    2007003999 A1    1/2007

OTHER PUBLICATIONS

European Patent Office, International Searching Authority, "International Search Report and Written Opinion" mailed Oct. 12, 2009; International Application No. PCT/EP2009/059187 filed Jul. 16, 2009.

(Continued)

*Primary Examiner* — Larry Donaghue
(74) *Attorney, Agent, or Firm* — Ingrassia Fisher & Lorenz, P.C.

(57) ABSTRACT

In a home network a number of receiving devices are connected to receive streamed audio visual content from one or more sources by way of a network hub. One source is a set top box, having a hard disc drive, which provides a real time broadcast stream, stream 1, as well as a recorded output stream, stream 2. Another source is local storage which is capable of outputting its stored content, stream 3, at ×32 normal speed, that is, fast forward. If there are bandwidth limitations on the network then the receiver (receiving the fast forward stream 3 will experience errors. When errors are detected, the receiver sends a message back to the source which then takes action to reduce the bit rate of its output stream.

16 Claims, 8 Drawing Sheets

(51) Int. Cl.
*H04L 12/853* (2013.01)
*H04L 12/851* (2013.01)
*H04L 12/833* (2013.01)
*H04L 12/825* (2013.01)
*H04L 29/06* (2006.01)

(52) U.S. Cl.
CPC ....... *H04L 47/2416* (2013.01); *H04L 47/2433* (2013.01); *H04L 47/2458* (2013.01); *H04L 47/25* (2013.01); *H04L 47/263* (2013.01); *Y02B 60/31* (2013.01); *H04L 65/4069* (2013.01); *H04L 65/80* (2013.01)

(56) References Cited

U.S. PATENT DOCUMENTS

| | | | |
|---|---|---|---|
| 6,445,679 B1 | 9/2002 | Taniguchi et al. | |
| 6,496,513 B1* | 12/2002 | Takamichi | 370/434 |
| 7,602,723 B2* | 10/2009 | Mandato et al. | 370/236 |
| 7,602,797 B2* | 10/2009 | Robotham | 370/412 |
| 8,238,253 B2* | 8/2012 | Morrill | 370/241 |
| 2002/0159457 A1* | 10/2002 | Zhang et al. | 370/391 |
| 2003/0067877 A1* | 4/2003 | Sivakumar et al. | 370/232 |
| 2003/0236904 A1* | 12/2003 | Walpole et al. | 709/231 |
| 2004/0184406 A1* | 9/2004 | Iwamura | 370/235 |
| 2005/0047345 A1 | 3/2005 | Suh | |
| 2005/0058149 A1* | 3/2005 | Howe | 370/428 |
| 2006/0268692 A1* | 11/2006 | Wright et al. | 370/229 |
| 2006/0280431 A1* | 12/2006 | Blattman et al. | 386/68 |
| 2007/0025325 A1 | 2/2007 | Kumar | |

OTHER PUBLICATIONS

Intellectual Property Office "British Search Report" mailed Jun. 18, 2009; Application No. GB0904376.1 filed Mar. 13, 2009.

* cited by examiner

|  | Bits 0-3 | 4-7 | 8-15 | 16-18 | 19-31 |
|---|---|---|---|---|---|
| 0 | Version | Header Length | Type of Service / DiffServ | Total Length | |
| 32 | Identification | | | Flags | Fragment Offset |
| 64 | Time To Live | | Protocol | Header Checksum | |
| 96 | Source Address | | | | |
| 128 | Destination Address | | | | |
| 160 | Options | | | | |
| 160/192+ | Data | | | | |

Bits 0-2 : Precedence
Bit 3 :   0 = Normal delay,  1 = Low delay
Bit 4 :   0 = Normal throughput, 1 = High throughput
Bit 5:    0 = Normal reliability, 1 = High reliability
Bits 6-7: Reserved for future use.

Figure 7 - IP header format

| 8 | 8 | 8 | 2 | 2 | 4 | 16 |
|---|---|---|---|---|---|---|
| Message ID | Message Length | Command Type | undefined | Vary bit rate | Severity level | Bit rate received |

Vary bit rate:   2 bit field indicating if an increase or decrease is necessary
          00:   No change
          01:   Reduce bit rate
          10:   Increase bit rate
          11:   Undefined Severity level: 4 bit field indicating adjustments
  required to bit rate.
          0000:   No change
          0001:   Minor errors experienced
          ....
          1101:   Major signal loss.
          1111:   Total signal loss Figure 8 – Bit rate Command

DYNAMIC QOS IN A NETWORK DISTRIBUTING STREAMED CONTENT

CROSS-REFERENCE TO RELATED APPLICATIONS

This application is a U.S. National-Stage entry under 35 U.S.C. §371 based on International Application No. PCT/EP2009/059187, filed Jul. 16, 2009, which was published under PCT Article 21(2) and which claims priority to Great Britain Application No. GB0904376.1, filed Mar. 13, 2009 and Great Britain Application No. GB0813203.7, filed Jul. 18, 2008.

TECHNICAL FIELD

The present invention relates to a method of providing dynamic QoS in a network distributing streamed content, and to a network for distributing streamed content.

BACKGROUND

Digital Video Broadcasting (DVB) systems are being developed to agreed standards for the delivery of digital television and data services. Currently home users, for example, are receiving both analog and digital television broadcasts. IPTV is also available.

Within the home environment, users are distributing incoming broadcast programming such as TV services, and stored video content, and a home network may carry other content. As the uses to which networks are put increase, there may be conflict leading to overload of the network resources. Variations may occur in the ability of the network to transfer any specific stream of data reliably and consistently.

Actual network operating conditions need to provide a guaranteed throughput level, that is, there needs to be Quality of Service (QoS).

Of course, some activities can require much larger bandwidth than normal, a requirement which clearly leads to conflict with any other activities over the network. In the home environment, the network may have adequate capacity when only real time streams of content are being played. However, problems may arise from delivery scenarios which allow some of the content to be played in non real time, i.e. trick modes. When trick modes are added, the bit rate of an individual stream may increase several fold and at this point potentially all of the streams being delivered suffer.

BRIEF SUMMARY

This invention seeks primarily to resolve the conflicts which arise when it is required to play non real time content.

According to the present invention there is provided a method of providing dynamic QoS in a network distributing streamed content, the network comprising one or more receiving devices for playing streamed content, one or more source devices for the content, and control means for routing the content from a selected source device to a selected receiving device upon request by the selected receiving device, the method comprising:

setting a priority for the content to be output from a selected source device dependent upon the characteristics of that content stream, and determining the throughput rate of content streams from each of the source devices in the network in dependence upon the priority set for each content stream.

In an embodiment, the priority of the streamed content is lowered when the content is to be played in non real time, for example, when it is streamed from a hard disk. Additionally and/or alternatively, the priority of the content is lowered when the content stream is to be played at a faster than normal rate, for example ×2, ×4, ×8, ×16 etc. This occurs for trick modes where the user is to move quickly forwards or backwards in time through the content, for example to search the content.

Fast forward and fast backward modes use greatly increased bit rates because they cannot utilize the compression schemes to their fullest extent. Any other alteration to the bit rate, for example, by altering the compression scheme to increase the bit rate will also result in the selected source device setting a lower priority for the content stream.

Whenever the content stream has a lower priority, the control means will give priority to other content streams so that their transmission is not adversely affected by the high bit rate required of the lower priority content stream.

In an embodiment, the method further comprises causing the selected source device to reduce the number of frames transmitted in content output with a lowered priority.

Preferably, the method further comprises causing the selected source device to transcode or transrate the content output with a lowered priority to reduce the throughput rate either by producing a lower resolution picture or by producing a lower bit rate at the original frame rate.

Any method of altering the throughput rate of content streams may, of course, be utilized.

The throughput rate of the output content streams, or the bandwidth the output content streams require, may be controlled by any of the elements of the network.

In one embodiment, each selected source device is arranged to set a priority for the content it is to output, and the throughput rate of the content streams from each source device is determined by the control means in dependence upon the priority set.

Thus, the control means, which may be a controller or router, may remove packets from a content stream of low priority to preserve the quality of a high priority stream, for example.

Whilst an alteration of the throughput rate of an output content stream may be caused simply by lowering the priority of the content stream, in a preferred embodiment, the selected receiving device is caused to request the selected source to alter the throughput rate of the output content stream.

Preferably, the method further comprises causing the selected receiving device to look at the quality of the content stream received and to feedback a request to alter the throughput rate of the content stream where the quality falls below a predetermined standard.

A receiving device may request the throughput rate of the content stream be reduced, for example, where it experiences errors, such as lost packets, in the content received. Thus, as a result of being given a lower priority, a content stream may suffer errors at the selected receiving device due to the loss of packets through the system. This could result in Mocking artifacts, black screens, and corrupted images being displayed at the selected receiving device. The receipt of such errors and corruptions can be arranged to cause the selected receiving device to request a reduction in the bit rate to a level where errors stop.

There are circumstances where the receiving device experiences a loss in quality of the content stream received. In these circumstances, the receiving device may alternatively request an increase in the throughput rate.

In an embodiment, packets in the content stream are sequentially numbered, the method further comprising causing the selected receiving device to identify if packets have been lost and to feedback a request to reduce the throughput rate when packets are lost.

Additionally and/or alternatively, the method further comprises causing the selected receiving device to identify any syntax errors in the lowered priority content stream received and to feedback a request to reduce the throughput rate when syntax errors occur.

A request for an alteration in the bandwidth required, or in the throughput rate of the output content, preferably comprises a command message incorporating a vary bit rate command. In a preferred embodiment, the command message additionally incorporates information identifying the actual received bit rate.

As set out above, selected content is routed to a selected receiving device at the request of that selected receiving device. Generally, such a request will be made upon operation of a user interface associated with the selected receiving device.

The source device is enabled to alter the bandwidth required by, or the throughput rate of, content output by the source device. This may comprise lowering the bit rate of low priority content when there are demands on the network which cannot all be fulfilled at a particular time. This capability of a source device to alter the bandwidth required by a signal may additionally be utilized by a source device to enable it to cope itself with excessive demand.

A source device, in the form of a storage device may encounter bandwidth problems, for example, if it receives or distributes multiple content streams from one or more storage devices simultaneously. The source device is arranged, in such circumstances, to set priority levels for each incoming and/or outgoing multiple content stream, and to lower the throughput rate of selected incoming and/or outgoing content streams in accordance with the set priority levels.

The present invention also extends to apparatus given the necessary functionality to perform the claimed method. For example, the invention extends to an intelligent set top box, storage device, or other source of stored content arranged to assign or set the priority for that content.

The invention also extends to an intelligent receiving device of streamed content enabled to check the quality of the content received and to feedback a request for change where the quality is not in accordance with predetermined standards.

According to a further aspect of the invention, there is provided a network distributing streamed content, the network comprising one or more receiving devices for playing streamed content, one or more source devices for the content, and control means for routing the content from a selected source device to a selected receiving device upon request by the selected receiving device, wherein each source device is enabled to set a priority for the content stream to be output dependent upon the characteristics of the content stream, and wherein the network is arranged to determine the throughput rate of content streams from each of the source devices in dependence upon the priority set for each content stream.

The invention also extends to message formats for packets of content streams. Such message formats will enable the priority of a stream to be carried by the stream.

BRIEF DESCRIPTION OF THE DRAWINGS

Embodiments of the present invention will hereinafter be described, by way of example, with reference to the accompanying drawings, in which:

FIG. 7 illustrates the format of the header of a standard IP packet, FIG. 8 shows an example of a command message for adjusting bit rate.

DETAILED DESCRIPTION

The invention is described herein with particular reference to a home network for receiving and distributing AV content. However, the invention is not limited for use with networks for home use, and there is no limitation on the content which can be distributed by the network. Thus, as well as distributing broadcast programs and stored video, for example, the network can distribute text, audio, graphics, web pages and other content. The invention is for use with networks generally and will find wide applicability.

Figure 1:
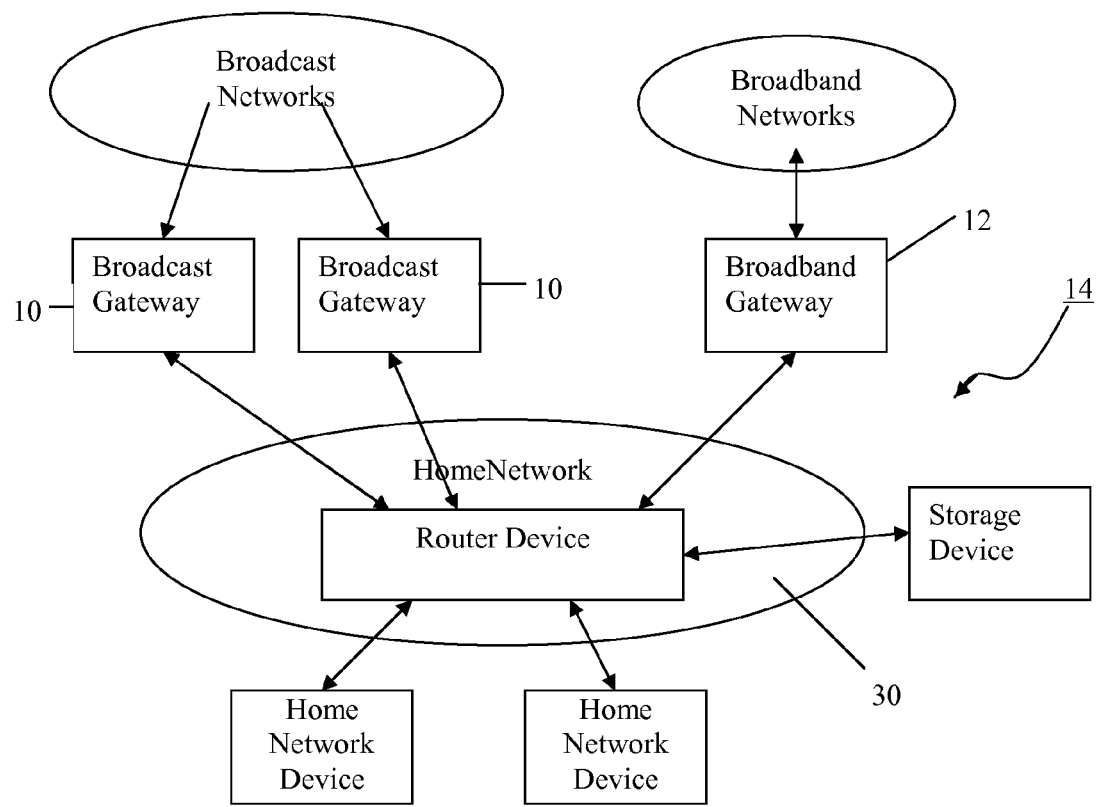
FIG. 1 illustrates schematically a network for receiving and distributing AV content.

FIG. 1 shows schematically a home network 14 for receiving and distributing AV content. It will be seen that the home network receives both broadcast and broadband content by way of appropriate gateways, namely broadcast gateways 10 and broadband gateways 12. The broadcast content may include both DVB and non-DVB services. The AV content and other data services can be delivered between the various entities of the network or delivered into the network from the gateway devices 10, 12. The home network 14 is an IP packet based network and, generally, each connected entity can unicast, multicast, or broadcast IP compliant packets between connected home network entities. The various entities may be connected by wireless or by wired connections.

It will be appreciated that the broadcast gateways 10 may be any devices arranged to receive broadcast programming. The references to broadcast programming comprehend transmissions broadcast terrestrially, by satellite and/or by cable, and/or in any other manner.

The devices receiving the broadcast programming are electronic devices such as television and other receivers and/or set top boxes. The broadcast gateway 10 may be any digital device for receiving broadcasts whether provided separately, in combination with other control circuits and devices and/or whether it is integrated within a television receiver.

Similarly the broadband gateway 10 may be any device arranged to receive broadband content, for example, by way of the internet. In the home, the broadband gateway 10 may be a personal computer.

The network 14 will include a network hub 30 incorporating infrastructure devices such as processing means to route content as required, for example to home network devices. These home network devices are arranged to receive the content which has been received by broadcast and broadband, and may be one or more different elements as required. The receiving network devices comprehend displays on tv receivers and computers, for example, and loudspeakers and audio players. Thus the receiving network devices and tv receivers, are any appropriate electronic devices for outputting analog audio visual content. The receiving network devices also comprehend various devices to store and/or process the received content such as recorders. Examples of recorders include video recorders and dvd recorders, as well as the personal video recorders (pvrs) which are becoming common.

Currently it is proposed that the network hub 30 will, to provide QoS systems, either allow for routing in dependence upon set priorities, or to control priorities centrally based on a knowledge of the stream types. Very little has been considered to date, about the effects or resolution of conflicts. One of the common situations that requires QoS management is when there is a network distributing video content and there is the possibility that trick modes will be performed over the network.

Trick modes are when content, rather than being played in a normal linear fashion, is played at a rate faster than normal, i.e. ×2, ×4, ×8, ×16 etc. Trick modes enable the user to move quickly through the content from a current position to some other point either forwards or backwards in time, that is, fast forward and fast backward modes. During use of such a mode, the user is generally more concerned with understanding the time reference of the content, rather than with the quality of the video. In some cases the position in the content can be assisted by the addition of an on screen display (OSD) overlay which shows the time and position in the content. The OSD may be generated locally to the display to assist with navigation.

The major issue from a network point of view is that when trick modes are activated there is generally an increase in the associated stream bit rate. This is because most compression systems utilize motion based compression algorithms in which the bit rate is reduced because only changes from the previous picture are transmitted. However, this also requires that reference pictures are regularly transmitted. These reference pictures form a complete image and consume more bits. In order to perform trick modes accurately, either the complete stream is sent, but at a faster rate, so that the bit rate increases in proportion to the playback rate, or the smaller size intermediate frames are dropped, which also results in a bit rate increase. This means that a network system which works well under normal conditions and copes, for example with 3, 4 or more users, may break when just one person activates a trick mode, because there is no longer spare capacity.

It is apparent from the above that when trick modes are activated, the bit rate requirement increases, and there is an increased likelihood that the network will fail. This invention seeks to solve this problem and proposes that a video source sets the video priority when it enters trick mode such that the trick mode user does not adversely impact any other users on the system who are watching in real time. This is dynamic QoS. The source dynamically adjusts the priority of the content it is outputting to the system.

How this content is transferred through the system will depend upon the protocol which is then used. If it is UDP then packets are transmitted with no feedback, and a source will not know that packets have not arrived. If it is TCP then, because this relies on an acknowledge message, the source may recognize when packets are being lost and seek to adjust the play-out rate accordingly. Without any adjustment at source it is possible that the person activating the trick mode might see errors at the receiver due to loss of packets through the system. Such errors may cause blocking artifacts, black screens, and/or corrupted images to be displayed at the receiver.

It is preferred that as errors in the stream are detected at the receiver, feedback is transmitted to the source to allow the bit rate to be reduced to a level where errors stop. There are several mechanisms that may be employed for the detection of errors. At both the transport stream and the IP packet level, packets are sequentially numbered so that it is easy for the receiving device to identify when packets have been lost. Furthermore, the receiver may also be caused to identify when there are syntax errors in the stream, for example, because information is missing. This error information is fed back to the source as an indication that the stream is not being correctly received. The source can then employ one or more mechanisms to reduce the bit rate to a point where there are no error messages coming back.

A further problem that can occur is that when the content is being recovered from a storage medium, such as a hard drive. The storage device itself may not be able to handle the increased bit rate. It may be possible to reduce this requirement and allow the playback of all streams in a manner without corruption.

When a trick mode is initiated over a network system, the resulting stream should be lowered in priority on a dynamic basis. Several levels of priority can be made available and the priority level setting may be arranged to be proportional to the speed setting selected. For example, a trick mode of twice speed would have a priority reduced by one from normal mode, whereas trick modes at say ×32 or ×64 speed would be at the lowest priority.

This setting of priority levels may be varied in dependence upon the needs of the overall network. The mechanism and protocol for setting the QoS level can make use of existing standards that are being developed and proposed. These proposals can then be deployed and operate across standard network equipment such as routers, wireless bridges, and other physical access networks which already recognize such standardized priority bits. This would minimize the impact of this stream on the remaining network elements.

Figure 2:
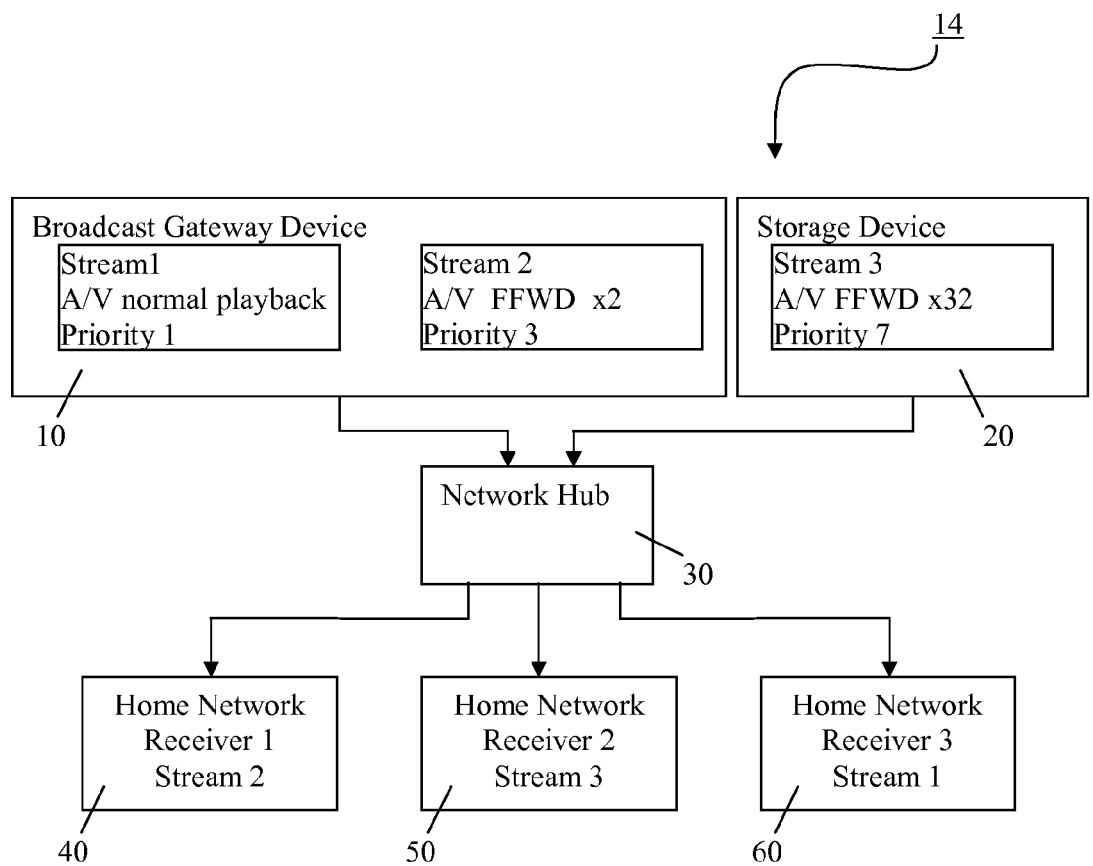
FIG. 2 shows the connection, in a network, of a number of receiving devices to receive content from a number of gateways.

FIG. 2 shows the use of a method of the invention in a typical network 14. A number of receiving devices 40, 50, 60 are provided and each may be operated by an individual user interface, such as a remote controller, not shown. The receiving devices 40, 50, 60 are shown as individual units but could, alternatively, be combined in a single unit with multiple outputs. Each receiving device 40, 50, 60 is connected to receive AV content from one or more sources 10, 20. The sources output individual streams of AV content. In the embodiment illustrated, a source 10 outputs multiple streams, whilst a source 20 outputs a single stream. The source 10 is, as shown, a broadcast gateway. In an embodiment, the source 10 is a set top box with a hard drive providing local storage. The set top box 10 provides a real time broadcast stream, stream 1, as well as a recorded output stream, stream 2, from its hard disk.

Between each source device 10, 20 and each receiver device 40, 50, 60, in addition to the path for the streaming of AV content, there is established a bi-directional control interface over which messages may be sent. This is used, for instance, to enable a receiver to select which stream is played, and to control the rate of play out of such content.

A network hub 30 in the form of a controller or router is provided to enable any receiver 40, 50, 60 to receive content from any source 10, 20 on request. A request for content is generally made by a user operating the remote controller associated with the selected receiver 40, 50, 60. The network hub 30 can also provide the bi-directional interface between sources 10, 20 and receivers 40, 50, 60 or the individual devices can communicate by Ethernet, wireless or other communication channels.

As described above, in the example of FIG. 2, one source device 10 is a set top box with the real time broadcast stream, stream 1, and a recorded output stream, stream 2. The other source 20 is a local storage device arranged to output stream 3 which, in the example shown, is output at thirty-two times normal speed. Thus, and as shown in FIG. 2, stream 3 has been set at the lowest priority, priority 7, whilst stream 1, which is the real time broadcast stream, has the highest priority, priority 1. If there are bandwidth limitations on the network then the receiver 50, which is to receive the fast forward stream 3, will be the most likely to experience errors. When errors are detected it is arranged that receiver 50 will send a message back to the source 20. Then the storage device 20 will take action to reduce the bit rate of its output stream.

Figure 3:
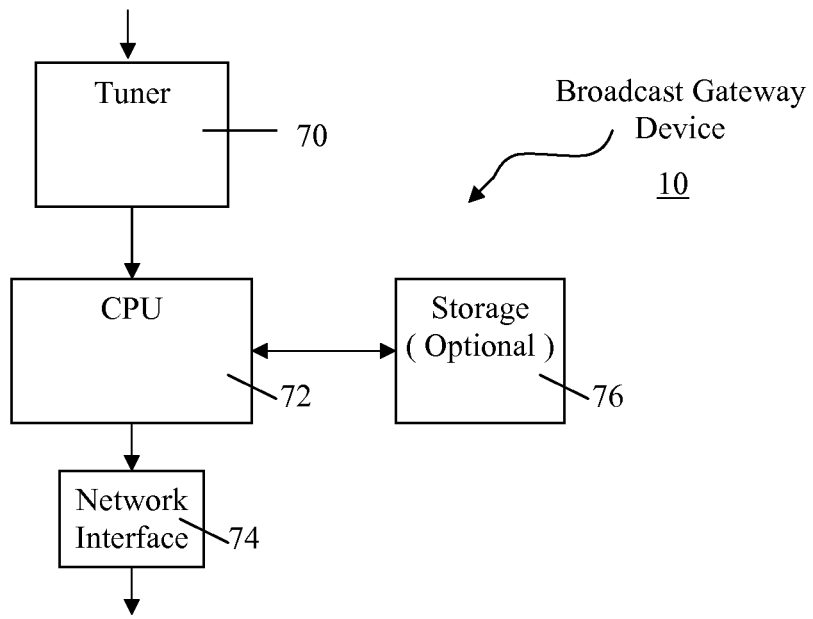
FIG. 3 illustrates an exemplification of a broadcast gateway device for use in a network as shown in FIGS. 1 and 2.

FIGS. 3 to 6 show examples of the structure of the elements contained within the network 14 of FIG. 2. FIG. 3 shows a broadcast gateway device 10. It has a tuner 70 arranged to receive content from broadcast networks. The tuner provides content to a network interface 74 under the control of a processor 72. As is shown, the broadcast gateway device 10 may also be provided with additional storage 76. The network interface 74 may be an Ethernet connection, for example. Of course, any other appropriate interface devices such as wireless interface, homeplug, powerline, USB and the like may be used.

Figure 4:
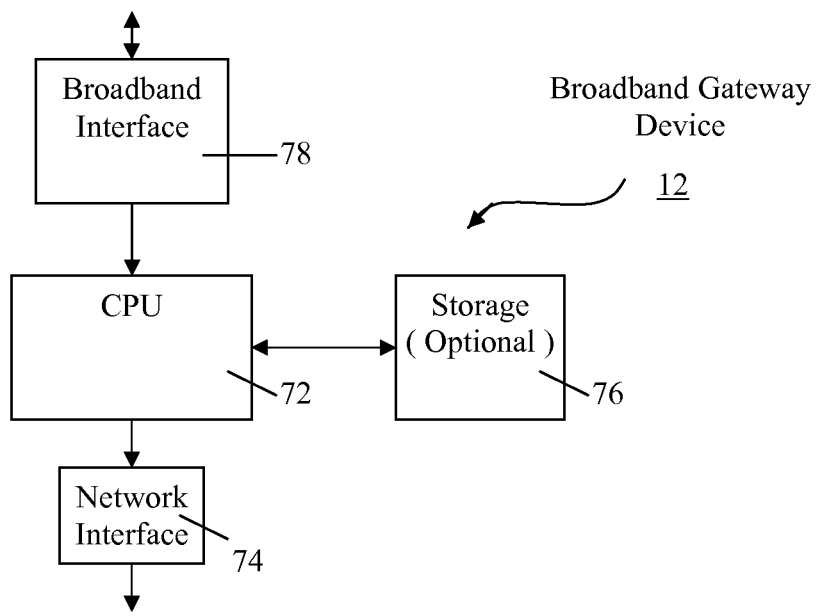
FIG. 4 shows an example of a broadband gateway device for use in a home network.

FIG. 4 shows a broadband gateway device 12. This device 12 has its own processor 72 and network interface 74. Content is fed to the network interface 74, under control of the processor 72, from a broadband interface 78. As previously, the broadband gateway device 12 may have additional storage 76.

Figure 5:
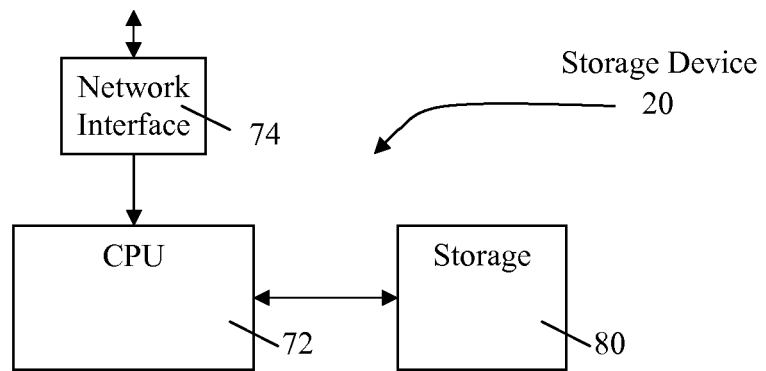
FIG. 5 shows a storage device for providing content to a home network.

FIG. 5 illustrates one example of a storage device 20. This storage device 20 preferably incorporates storage 80, for example, in the form of one or more hard discs, non volatile memory or other storage medium. Content from the hard discs may be fed to a network interface 74 under the control of a processor 72.

Figure 6:
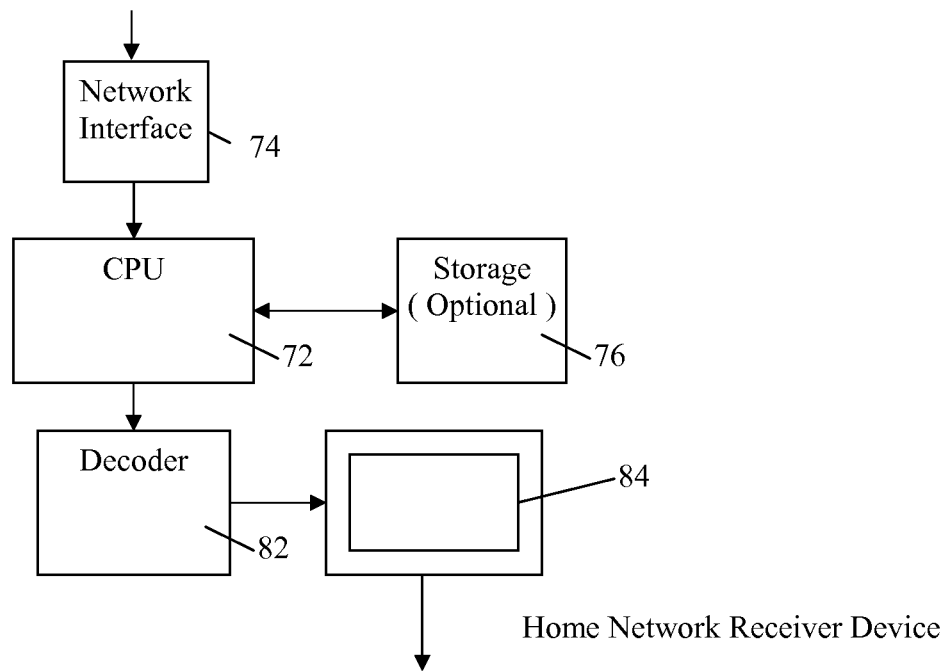
FIG. 6 illustrates an example of a receiver for AV content for use in a home network.

FIG. 6 shows an example of a home network receiver as 40, 50 or 60. As previously this device 40, 50 or 60 is provided with an appropriate network interface 74 and a processor 72. It is also provided with an optional additional storage device 76. Each receiver device 40, 50 or 60 is arranged to receive content by way of a corresponding network interface 74 under the control of its processor 72. The receiver is provided with a decoder 82 to appropriately decode and decompress the AV content received which it then applies to presentation means 84 including a display. The presentation means will also incorporate loudspeaker means so that the audio visual content can be made available to a user.

An IP packet consists of a header section and a data section. FIG. 7 shows a standard IP packet header. The first word of the header includes a "Type of Service" field with eight bits. As shown these bits are bits 8 to 15 of the first word o. Several of these bits can be used as a means to set priority and will be recognized by routers and network devices as determining the priority of packets to be transmitted. Thus, under the $RFC_{791}$ protocol, the eight bits of the "Type of Service" field are allocated as follows:

Bits 0-2: precedence
Bit 3: 0=normal delay, 1=low delay
Bit 4: 0=normal throughput, 1=high throughput
Bit 5: 0=normal reliability, 1=high reliability
Bits 6-7: reserved for future use.

A newer, alternative protocol, $RFC_{4594}$, refers to the field at bits 8 to 15 in the first word of the header as the "DiffServ" field which provides some backwards compatibility to the previous definition.

In a wholly enclosed network where there would only be traffic between defined types of devices, a purely arbitrary mapping of priority levels could be conceived. Thus, bits 0-2 precedence could be assigned as an 8 level priority indicator where in means highest priority and 000 means lowest priority. However, as the home network may play a role in a much broader network environment it is also better to have a more standardized use of these parameters. It is suggested to use DiffServ codes $CS_3$, $AF_{31}$, $AF_{32}$ and $AF_{33}$ to provide four levels of priority. This field is used as it is likely to be recognized by standard network components, so that the invention is not reliant on specialized networking components. This is not the only mechanism that could be used, and in future other fields may be assigned as standard methods of setting packet priority.

Table 1 shows a typical allocation of bits for a wholly enclosed system, where no other traffic is to be expected. The bits are used to indicate priority of the stream based on the relevant trick mode rate required. It is also possible even for normal streams to indicate that one receiver, perhaps in a preferred location, has higher priority than others.

TABLE 1

Priority Level using IP precedence bits

| bits | Meaning | Priority Level |
|---|---|---|
| 111 | High priority stream | 1 |
| 110 | Normal priority/real time stream | 2 |
| 101 | Fast forward/reverse × 2 | 3 |
| 100 | Fast forward/reverse × 4 | 4 |
| 011 | Fast forward/reverse × 8 | 5 |
| 010 | Fast forward/reverse × 16 | 6 |
| 001 | Fast forward/reverse × 32 | 7 |
| 000 | Fast forward/reverse × 64 | 8 |

Table 2 shows the allocation of bits when using Differentiated Services Code Point (DSCP) as a means of bandwidth prioritization. In that case there are less levels available, but it is still possible to achieve the main result which is the differentiation between real time and trick mode schemes.

TABLE 2

Priority Level using DSCP

| DSCP value | DSCP name | Meaning | Priority Level |
|---|---|---|---|
| 011000 | CS3 | High priority stream | 1 |
| 011010 | AF31 | Normal priority/real time stream | 2 |
| 011100 | AF32 | Fast Forward/reverse × 2, ×4, ×8 | 3 |
| 011110 | AF33 | Fast Forward/reverse × 16, ×32, ×64 | 4 |

Exactly which method of priority setting is initialized will be determined depending upon the exact network configuration adopted. It may be that the final bit settings will need to be adjusted to obtain the best effect.

In the example shown in FIG. 2, the stream 3 from the storage device 20 has been set at a low priority, priority level 7, whilst stream 1, which is the real time broadcast stream, has the highest priority, priority level 1. All three streams 1,2,3 are passed through the network hub 30. If there is a lack of bandwidth this will be recognized by the network hub 30. The hub 30 will then consider the precedence levels or DSCP values of the streams and, if necessary, will drop packets from stream 3. As a consequence, the receiver 50, which is to receive stream 3, may then experience errors as packets are dropped. The decoder 82 and processor 72 of the receiver 50 will determine that there are errors in the stream 3 received. At this point a message is returned by the receiver 50 to the storage device 20. This message is returned over the control channel interface which may be provided, as set out above, by way of the network hub 30 or by a separate communication channel.

FIG. 8 shows an example of the message sent when errors do occur. As illustrated, the message is a command which includes an eight bit "Message ID" which will provide a unique identification of the message. It also contains a "Command Type" field which identifies the message as a change bit rate command. A two bit "Vary Bit Rate" field indicates whether an increase or decrease of the bit rate is necessary. As shown, the two bit "Vary Bit Rate" field is allocated as follows:

00: No change
01: Reduce bit rate
10: Increase bit rate
11: Undefined

The command message of FIG. 8 also has a four bit field to indicate the severity of the problem, a "Severity Level" field, which indicates whether major or minor adjustments are required to the bit rate. The four bits may be allocated, as:

0000: No change
0001: Minor errors experienced
1101: Major signal loss.
1111: Total signal loss Finally the message has a sixteen bit field which is used to indicate the received bit rate in kb/s. If the bit rate has not been established then the "Bit Rate Received" field is set to all ones.

As described above, because of errors in the stream 3 it is receiving, the receiver 50 returns a command message, as described with reference to FIG. 8, to the storage device source 20. It will be appreciated that the message received by the source device 20 provides an indication of the severity of the errors experienced. This can be by way of the "Severity Level" field alone. In some cases the message may also provide information as to the bit rate received. Additionally and/or alternatively, the message may provide an indication of the actual packet numbers received. Thus, the source device 20, by way of its processor 72, should be able to accurately determine the necessary bit rate reduction so that it can continue to send the stream 3, but without errors, through the network.

As long as the receiver 50 experiences errors, it will send a bit rate command message, as shown in FIG. 8, at regular intervals. The processor 72 in the storage device 20 forwarding the stream 3 will then take action to reduce the bit rate. If the received messages contain an estimation of the received bit rate then the processor 72 in the source 20 may use this to more accurately estimate the required reduction in bit rate for the particular stream. Otherwise the processor 72 of the source 20 will use the "Severity Level" flag as an indicator. The source processor 72 may ignore subsequently received messages for an appropriate period of time to allow changes to propagate through the network. Of course, if further bit rate command messages are received after that time period, then further action by the source processor will be necessary.

As will be apparent from FIG. 8, as well as issuing a message that the bit rate be decreased, a receiver can also request an increase in bit rate. This might be used when a receiver is not experiencing errors, but wishes to increase the quality of the signal being received. Thus, and as will be apparent, the key elements of the command message are that it contains an instruction for a selected source to change the transmitted bit rate and optionally includes details as to the current bit rate actually being received.

Figure 9:
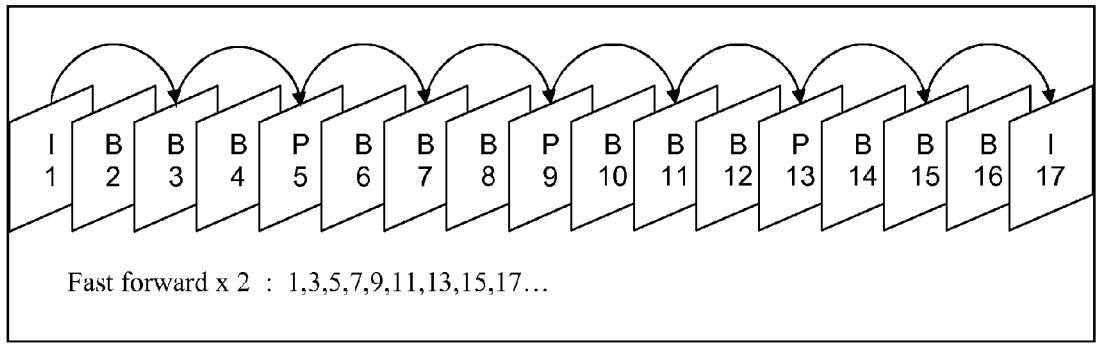
FIG. 9 illustrates schematically a stream of AV content indicating how it is played to provide fast forward at ×2 normal rate, FIGS. 10 and 11 also illustrate sequences of play when AV content is played at faster speeds.
Figure 10:
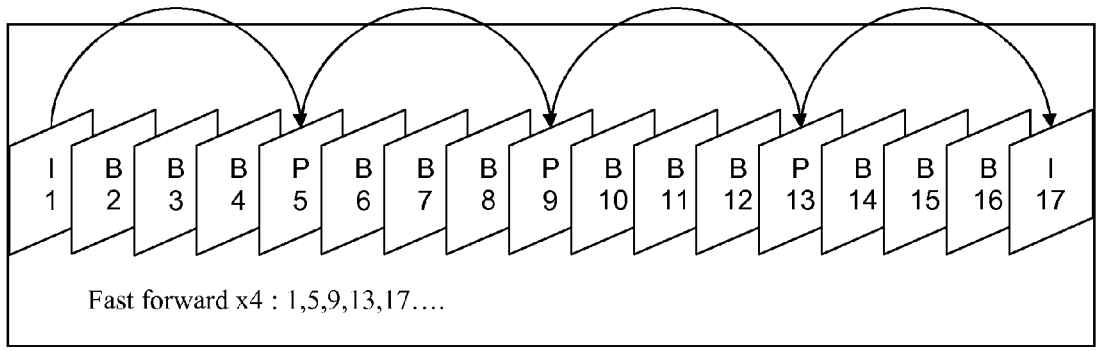
Figure 11:
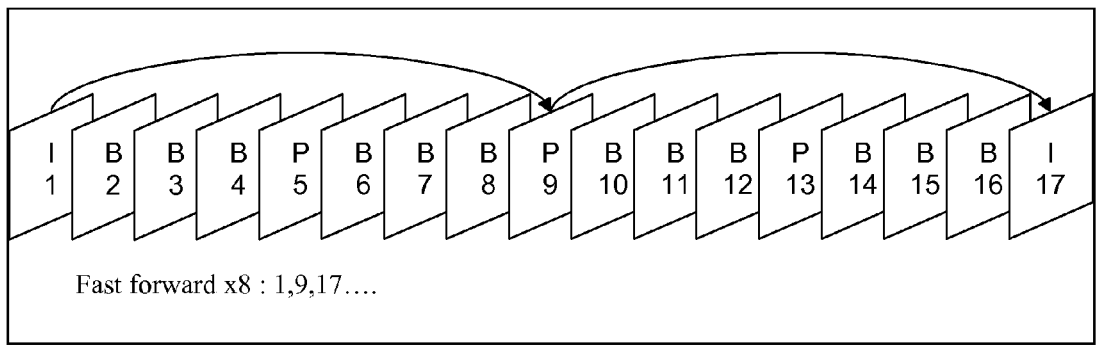

We have seen that, when errors are experienced, a source is asked to lower the bit rate of the content it outputs. The simplest mechanism that can be proposed is to reduce the number of frames that are transmitted. FIGS. 9 to 11 show how a typical compressed bit stream is constructed, using the terminology developed for the MPEG standard. However, the principles can be applied equally to alternate compression schemes.

FIGS. 9, 10 and 11 show the typical sequence of events for an MPEG encoded video sequence and what happens when trick modes are played at speeds of ×2, ×4, ×8 normal speed. As is well known, there are three types of frames used in video compression, I frames, P frames and B frames. An I frame is effectively a fully specified picture. P frames only hold changes from a previous reference frame, and a B frame uses differences between both preceding and following reference frames to specify its content. In normal play, the large size I frames are interspersed with smaller size P frames and even smaller size B frames as is apparent in FIG. 9. However, when trick modes are activated only a selection of the frames are transmitted. The data rate increases because the small size B frames are dropped and at the limit only I frames are transmitted. The receiver may repeat the same frame several times. Because the display rate is fixed, it is necessary to transmit the frames at a higher rate than normal.

FIG. 9 shows an idealized stream where the group of pictures (GOP) structure is uniform and there is a P frame every 4 frames, and an I frame every 16 frames. This makes it very easy to make trick modes which increase by a factor of 2. In order to produce a stream playing fast forward at twice normal speed, it is only necessary to display every other picture. FIGS. 10 and 11 show this same stream with the trick mode increased to ×4 or ×16. With the streams as illustrated it is possible to transmit only the frames needed for display.

Figure 12:
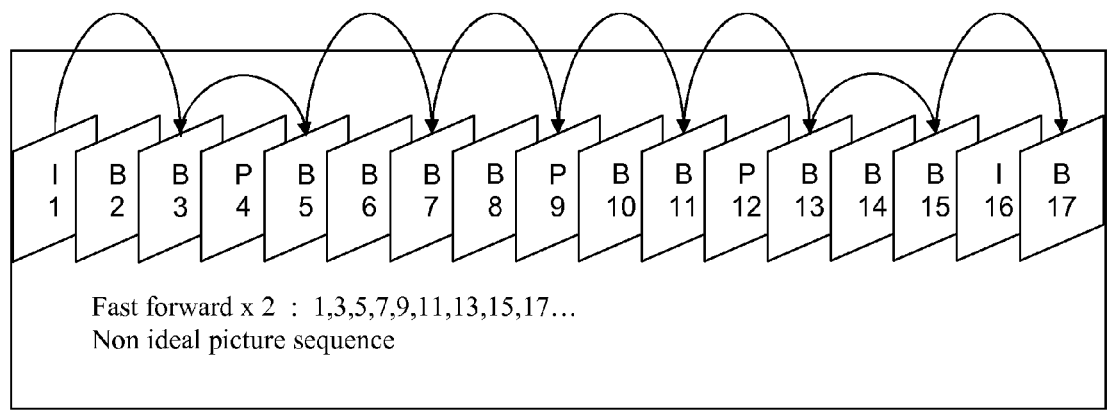
FIGS. 12 and 13 show non-ideal encoded video formats where I and P frames are not a predictable distance apart, and illustrate the sequence of play for fast forward ×2.
Figure 13:
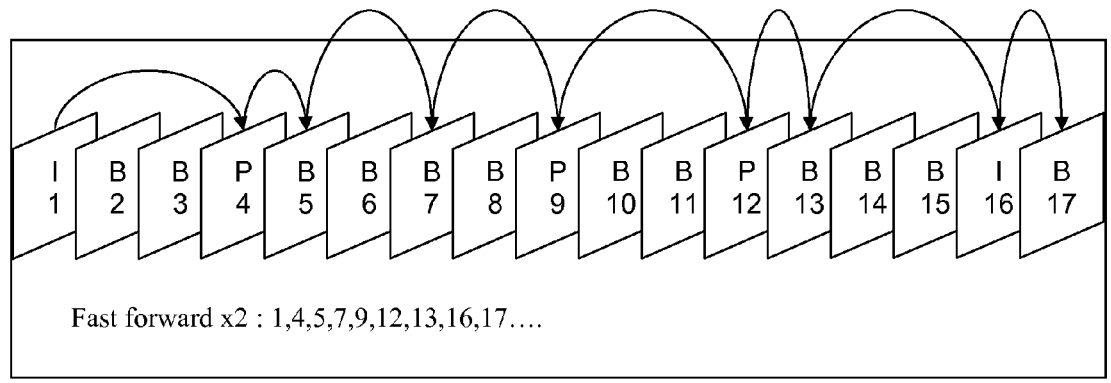

However not all encoded streams follow this format. Some formats have a variable GOP to improve compression and the I and P frames are no longer a predictable distance apart. At the slower trick modes it is necessary to keep both the I and P frames, but the B frames can be easily discarded as there is no other frame dependent on them. In this case, in order to provide smooth trick modes at slow speeds, it is generally necessary to utilize a decoder which can decode faster than real time and decode every frame but only display every 2nd or 4th. This is because the B frames cannot in fact be decoded without having the I or P frames present. FIG. 12 shows this particular case, and in order to decode this stream all frames would need to be sent. However, since the requirements of someone fast forwarding through the stream is to identify a new piece of content it can be considered acceptable to modify the playback sequence so that not all frames are transmitted. This will result in a motion which is perhaps less than ideal but there will be no break up of individual pictures. FIG. 13 shows the sequence that may have to be employed in this case to reduce the number of frames.

Figure 14:
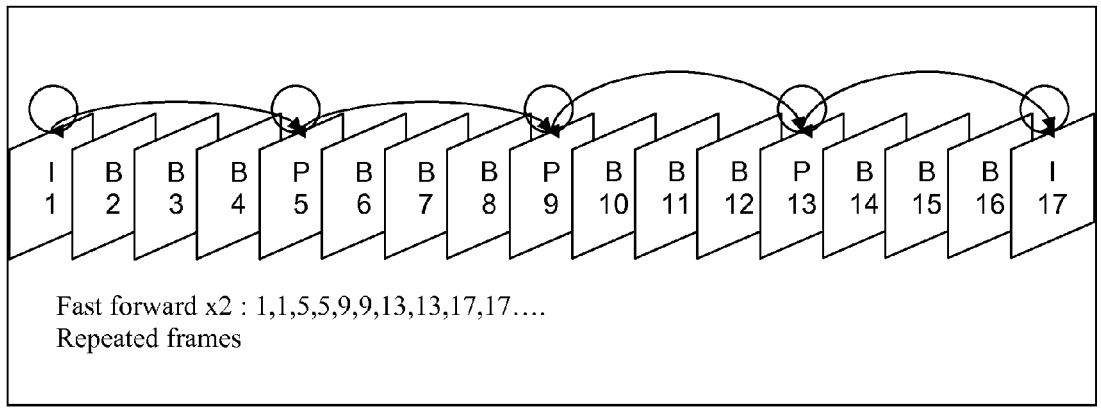
FIG. 14 illustrates transmittal of fewer frames of an AV content stream to provide fast forward ×2.

Because only the smaller B frames are removed, the effective bit rate of the stream increases. Thus, it becomes necessary to send fewer frames in total and have the receiver now repeat the display of frames. Thus each frame transmitted will be displayed for 2 or 3 frame periods as necessary in order to reduce the bandwidth. FIG. 14 shows an indication of what happens when fewer frames are transmitted, and the receiver uses each frame a multiple number of times. This example would be used instead of FIG. 9 for a fast forward mode at ×2 but with lower bit rate.

Figure 15:
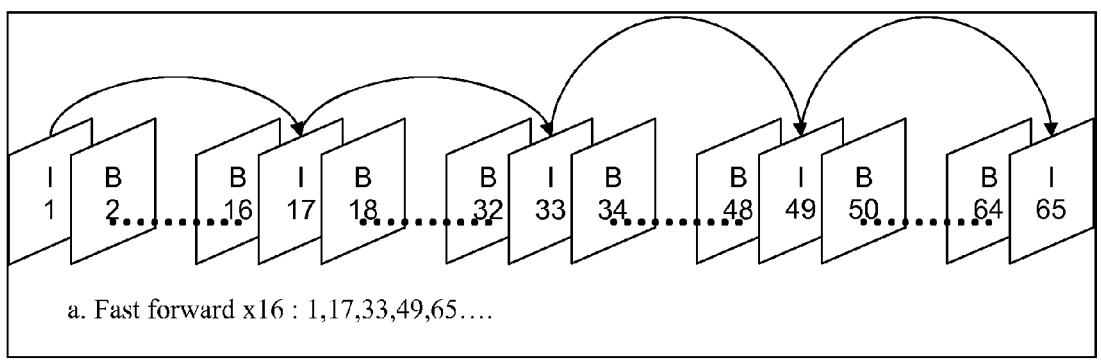
FIGS. 15 and 16 illustrate how the bit rate for the transmittal of an AV content stream at ×16 can be reduced by sending fewer frames.
Figure 16:
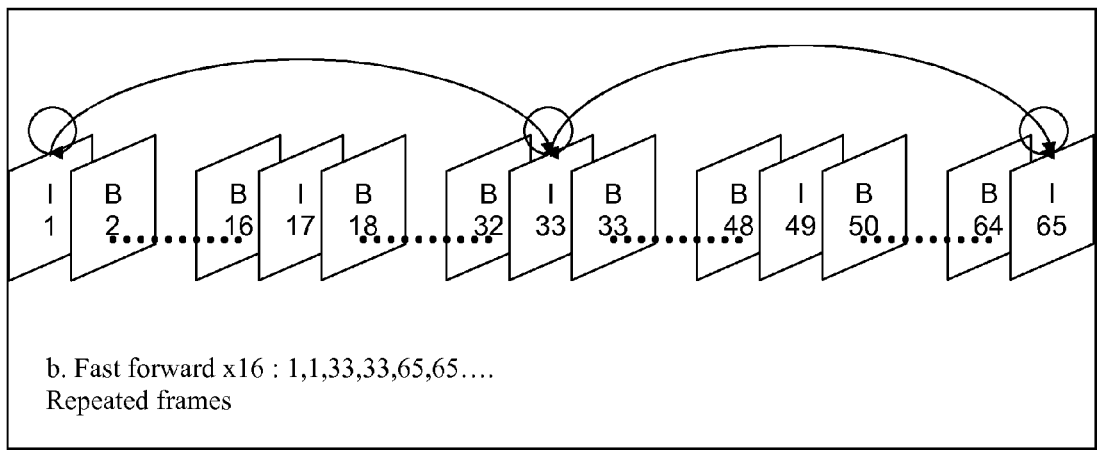

FIGS. 15 and 16 show a further progression of this idea which is most useful at higher speed trick modes when only I frames are displayed. By repeating the display of I frames, the required bit rate can be effectively halved.

The examples are shown for content which is playing in the forward direction. The same principles can be employed when content is being played backwards.

This particular mechanism can also be used directly at the sources 10 and 20 to reduce the effective read rate of content coming from storage 76, 80. In conjunction with this, if it is the source 10, 20 itself which has problems, the source should also be able to dynamically reduce the number of frames it transmits to the network for this particular stream in order to minimize and reduce seek times. With the source 10, which outputs two streams, if its processor 72 determines that it is not reading both streams at sufficient speed action is taken. As stream 2 is set to priority level 3, the processor 72 at source 10 would skip more frames of stream 2 in order to preserve the bit rate of stream 1.

As the trick mode speed is increased, a point is generally reached where the only frames that are being transmitted are the I frame content. Rather than just sending I frames less often, short sequences of moving content can be transmitted. Since this will use the smaller size B and P frames it is possible that this will use less bit rate than constant I frames.

It is also possible to make use of improvements in processing power to transcode the frames "on the fly" to a lower bit rate, either by reducing the quantization levels and keeping the resolution the same, but reducing detail, or by reducing the resolution of the transmitted frames. By these mechanisms it would be possible to keep the frame rate image moving at the normal rate but reduce the bit rate/quality.

It will be appreciated that variations to and modifications in the embodiments as described and illustrated may be made within the scope of the following claims. For example, methods other than reducing the number of frames transmitted, and/or reducing the bit rate may be used to alter or determine the throughput rate, or bandwidth required, by a content stream.

The invention claimed is:

1. A method of providing dynamic Quality of Service (QoS) in a home network distributing streamed audiovisual content, the home network comprising:
   a plurality of sources outputting streams of audiovisual content;
   a plurality of receiving devices each connected to receive audiovisual content from one or more of said sources, each receiving device being arranged to output the received content stream as analog audiovisual content; and
   a network hub for routing the content from one of said sources to a selected one of said receiving devices upon request from said selected one receiving device;
   the method comprising:
   setting a priority for the content stream to be output from said one source, priority being set in dependence upon the characteristics of that content stream the playback rate of the content stream;
   entering a trick mode of the content stream from the said one source in which the content is adjusted so as to be presented at a faster than normal playback rate either forwards or backward in time, wherein the audiovisual content stream has a bit rate that is higher in the trick mode than in normal playback;
   dynamically lowering the priority of the streamed content output in response to entering the trick mode, wherein at least two playback rates are available when the trick mode is entered, one of said at least two rates being faster than the other of said at least two rates, and both of said at least two rates being faster than the normal rate, wherein a lower priority is determined for the faster rate than the slower rate; and
   determining the throughput rate of content streams from each of the sources in the network in dependence upon the priority set for each content stream.

2. A method of providing dynamic QoS in a network according to claim 1, wherein said one source is provided in a first source device comprising a television receiver, a set top box or other electronic device for receiving streamed broadcast content, or a personal computer or other electronic device for receiving streamed broadband content.

3. A method of providing dynamic QoS in a network according to claim 1, wherein the receiving devices are operable by individual user interfaces.

4. A method of providing dynamic QoS in a network according to claim 1, comprising lowering the priority of the streamed content output from said one source when that content is no longer played in real time.

5. A method of providing dynamic QoS in a network according to claim 1, further comprising, when the priority of the streamed content output from said one source is lowered, causing said one source to reduce the number of frames transmitted in the content output.

6. A method of providing dynamic QoS in a network according to claim 1, further comprising, when the priority of the streamed content output from said one source is lowered, causing said one source to transcode or transrate the content output to reduce the throughput rate either by producing a lower resolution picture or by producing a lower bit rate at the original frame rate.

7. A method of providing dynamic QoS in a network according to claim 1, further comprising causing said selected one of the receiving devices to request said one source to alter the throughput rate of the output content stream.

8. A method of providing dynamic QoS in a network according to claim 7, comprising causing the selected receiving device to look at the quality of the content stream received and to feedback a request to alter the throughput rate of the content stream where the quality falls below a predetermined standard.

9. A method of providing dynamic QoS in a network according to claim 1, wherein each of a plurality of receiving devices receives audiovisual content from a selected one of said sources, each selected source has set a priority for the content it is to output, the network hub has determined the throughput rate of the content stream from each source in dependence upon the set priority, and wherein the content streams include packets which are sequentially numbered, the method further comprising causing each receiving device to identify if packets have been lost and to feedback a request to reduce the throughput rate when packets have been lost.

10. A method of providing dynamic QoS in a network according to claim 1, further comprising causing each receiving device to identify any syntax errors in the lowered priority content stream received and to feedback a message to the source device that outputted said lowered priority content stream, the message including severity level component indicating one of plural severity levels of said syntax errors and to request to reduce the throughput rate when syntax errors occur; and, in response to receiving a feedback message, the receiver reducing the throughput rate in accordance with the severity level such that a higher severity level causes a larger reduction in the throughput rate.

11. A method of providing dynamic QoS in a network according to claim 9, additionally comprising enabling each source to set priority levels for each incoming multiple content stream, and to lower the throughput rate of selected incoming content streams in accordance with the set priority levels.

12. A home network distributing streamed audiovisual content, the home network comprising
- a plurality of sources outputting streams of audiovisual content;
- a plurality of receiving devices each connected to receive audiovisual content from one or more of said sources, each receiving device being arranged to output the received content stream as analog audiovisual content; and
- a network hub for routing the content from one of said sources to a selected one of said receiving devices upon request from said selected one receiving device;
  - wherein said one source is provided in a first source device comprising a television receiver, a set top box or other electronic device for receiving streamed broadcast content, or a personal computer or other electronic device for receiving streamed broadband content,
  - wherein said one source is enabled to set a priority for the content stream to be output dependent upon the characteristics of the content stream including the playback rate of the content stream;
  - wherein said one source is enabled to enter a first trick mode in which the audiovisual content stream is adjusted so as to be presented at a faster than normal playback rate either forwards or backward in time, wherein the audiovisual content stream has a bit rate that is higher in the first trick mode than in normal playback;
  - wherein said one source is enabled to dynamically lower the priority of the streamed content output from the one source in response to entering the first trick mode;
  - wherein at least two playback rates are available when the trick mode is entered, one of said at least two rates being faster than the other of said at least two rates, and both of said at least two rates being faster than the normal rate, wherein a lower priority is determined for the faster rate than the slower rate; and
  - wherein the network is arranged to determine the throughput rate of content streams from each of the sources in the network in dependence upon the priority set for each content stream.

13. A network hub comprising:
a network interface configured to distribute streamed audio visual content between a source device and a receiving device on a home network; and
a processor configured to determine the playback rate of the audio visual content stream and to adjust a throughput rate of the audiovisual content stream so that real time content is transmitted on the home network at a higher priority than pre-recorded content, the processor being further configured to determine that a trick mode has been entered in which the recorded audiovisual content stream is adjusted so as to be presented at a faster than normal playback rate either forwards or backward in time, wherein the audiovisual content stream has a bit rate that is higher in the trick mode than in normal playback, wherein at least two playback rates are available when the trick mode is entered, one of said at least two rates being faster than the other of said at least two rates, and both of said at least two rates being faster than the normal rate, wherein a lower priority is determined for the faster rate than the slower rate, and to dynamically lower the throughput rate of the streamed content output in response to entering the trick mode.

14. The network hub of claim 13 wherein the audiovisual content is identified as real-time or pre-recorded by the source device.

15. The network hub of claim 13 wherein the processor is further configured to reduce the priority of the real-time media stream when the real-time media stream is switched to provide trick play content.

16. The network hub of claim 13 wherein the processor is further configured to reduce the priority of the real-time media stream when the real-time media stream enters a search mode.

* * * * *